Feb. 19, 1929.
J. M. AVERY
1,702,758
SELF CLOSING BAR GATE
Filed May 21, 1927
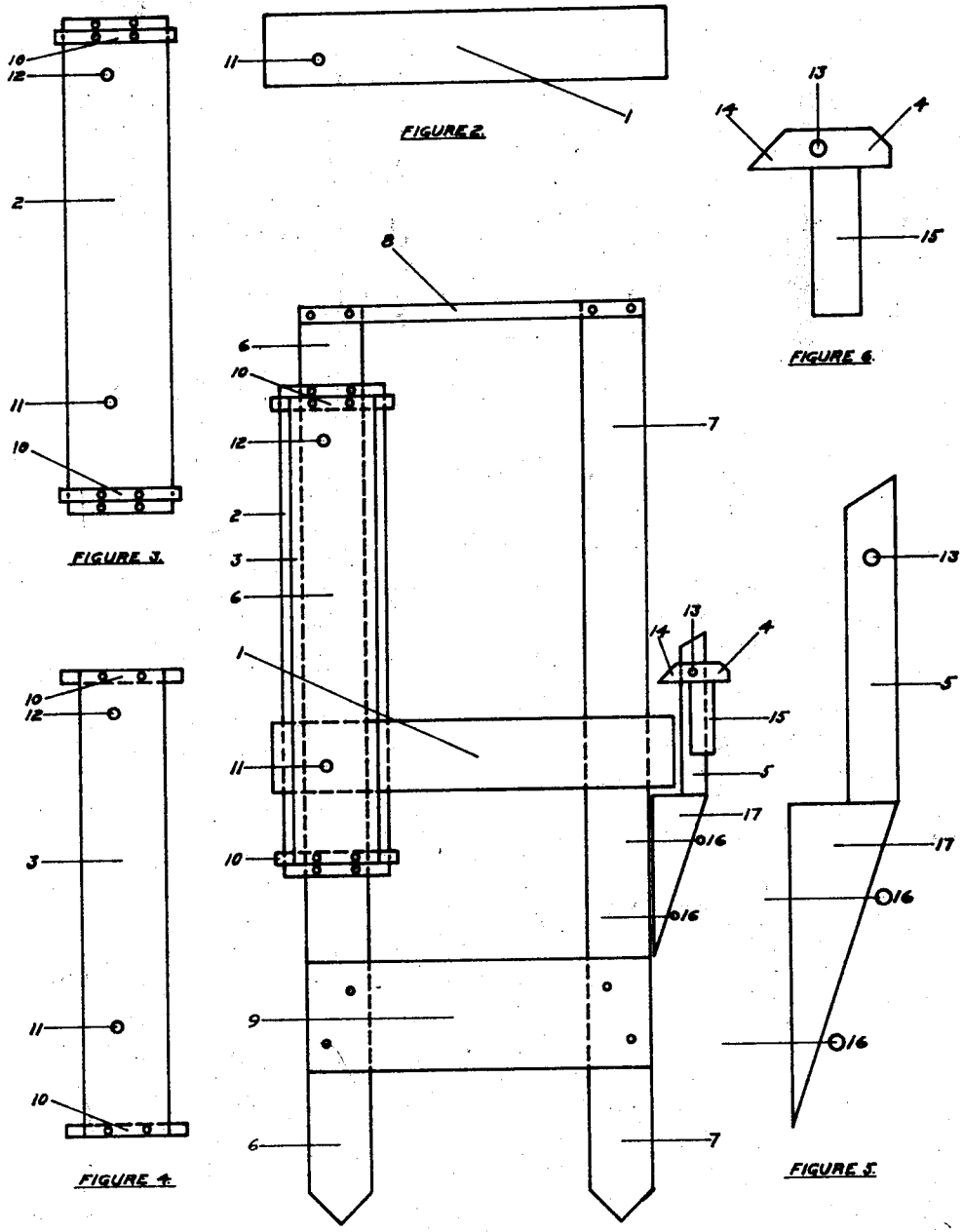
Inventor
John Morehead Avery Patented Feb. 19, 1929.

1,702,758

UNITED STATES PATENT OFFICE.

JOHN MOREHEAD AVERY, OF PLUMTREE, NORTH CAROLINA.

SELF-CLOSING BAR GATE.

Application filed May 21, 1927. Serial No. 193,257.

This invention is to confine or turn stock, such as cattle or horses and is intended to take the place of an ordinary gate or door and is useful on farms as a passway for persons instead of having to open heavy farm gates or bars. This gate acts by gravity and closes and fastens itself automatically.

In the accompanying drawing, Figure 1 shows the gate complete with the bar down and in the holder and fastened by the catch:

Figure 2, shows the bar.

Figure 3, shows the back guide for the bar.

Figure 4, shows the front guide for the bar.

Figure 5, shows the holder which stops and holds the bar when down, and

Figure 6, shows the catch which fastens the bar in place in the holder.

There are two spaced guides 2 and 3 between which a bar is horizontally pivoted and a stop 12 intermediate the ends of said guides to limit the upward movement of the bar and a gravity catch 4, for holding the gate in a closed position. A bolt 11, passes through the front guide 3, and through the bar 1 and through the back guide 2, and the bar 1 turns or revolves freely on the bolt 11, between two guides 2 and 3. The guides are fastened to a post 6. Holder 5, shown in Figure 5, is fastened to another post 7 and holds the bar 1 when down. Catch or latch 4, as shown in Figure 6, is bolted to the top of the holder by the bolt 13, and works freely on the bolt 13. This catch has a tail 15 and lip 14.

In order to raise the bar and open the gate, a person will elevate the tail 15 of the catch and this will lower the lip 14 of the catch so that the bar 1 can pass out of the holder 5; he will then raise the bar 1, until it strikes the stop 12 and he will then pass through the opening between the posts 6 and 7; he will then simply turn the bar 1 loose and it will fall back by gravity into the holder 5. In passing into the holder the bar will strike and lower the lip of the catch 14, and this will elevate the tail of the catch 15 and after the bar is below the lip, the tail will descend by gravity and this will raise the lip over the bar and fasten the bar in the holder.

The catch or latch may be made in one piece or the top 4 in one piece and the tail 15 in another and the two pieces be fastened together. The holder may be made in one piece or the top 5 in one piece and the bottom 17, in another and the two pieces be fastened together.

I claim:

In a gate, two spaced guides between which a bar is horizontally pivoted, a stop intermediate the ends of said guides to limit the upward movement of the bar and a gravity latch for holding the gate in a closed position.

JOHN MOREHEAD AVERY.